Nov. 10, 1959

H. K. MOORE 2,912,635

ELECTRICAL REGULATOR DEVICE FOR GENERATORS

Filed Nov. 1, 1956

H. K. MOORE
INVENTOR.

BY E. C. McRae
J. R. Faulkner
D. H. Oster

ATTORNEYS

Nov. 10, 1959  H. K. MOORE  2,912,635
ELECTRICAL REGULATOR DEVICE FOR GENERATORS
Filed Nov. 1, 1956  3 Sheets-Sheet 2

H. K. MOORE
INVENTOR.

BY E. C. McRae
J. R. Faulkner
G. H. Oster

ATTORNEYS

Nov. 10, 1959 H. K. MOORE 2,912,635
ELECTRICAL REGULATOR DEVICE FOR GENERATORS
Filed Nov. 1, 1956 3 Sheets-Sheet 3

H. K. MOORE
INVENTOR.

BY *E. C. McRae*
*J. R. Faulkner*
*F. H. Oster*

ATTORNEYS

United States Patent Office 2,912,635
Patented Nov. 10, 1959

2,912,635
ELECTRICAL REGULATOR DEVICE FOR GENERATORS

Harold K. Moore, Saline Township, Mich., assignor to Ford Motor Company, Dearborn, Mich., a corporation of Delaware Application November 1, 1956, Serial No. 619,698

4 Claims. (Cl. 322—25)

This invention relates to improvements in electrical voltage and current regulators and more particularly to such regulators utilizing semiconductor control elements.

An object of my invention is to provide a transistorized regulator circuit adaptable for simultaneous voltage and current regulation at voltage values below which thermionic vacuum tubes do not efficiently operate.

Another object of my invention is to provide an efficient storage battery charge regulator having no moving parts.

A further object of my invention is to provide an automotive voltage regulator with improved life and performance. The use of my invention in this manner permits a generator to be designed having a field which provides the desired armature output at a field voltage less than the rated armature voltage. In this manner I provide through my invention a regulated field supply over a greater range of armature speeds, and I provide a battery charging condition at a reduced armature r.p.m.

Further objects and advantages of my invention are apparent from the following description, in which.

Figure 1:
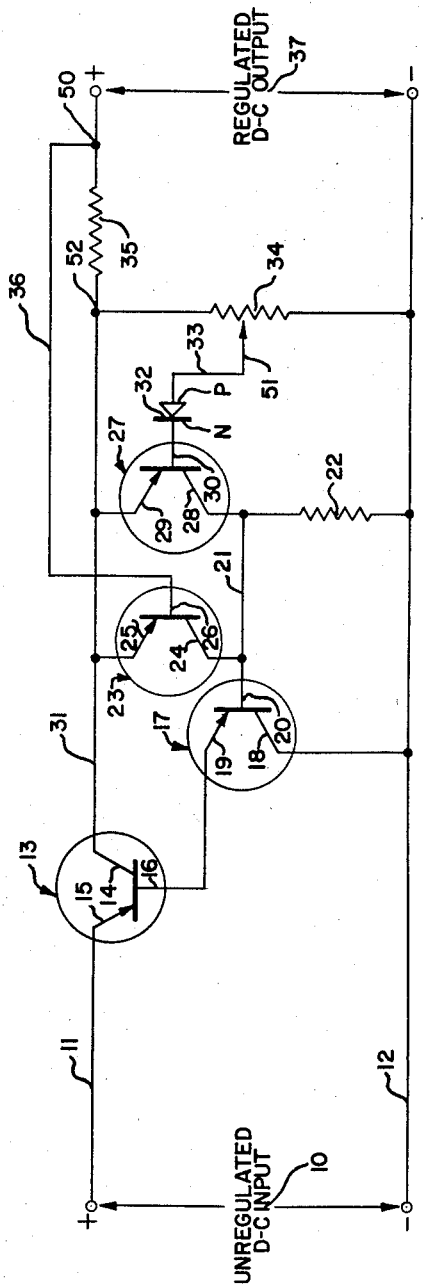
Figure 1 is an electrical schematic diagram of my invention.

Referring to Figure 1, a D.-C. voltage to be regulated is applied at the input terminals 10 with the more positive input at lead 11. Lead 11 is connected to the emitter terminal 15 of p–n–p transistor 13. The collector terminal 14 thereof is connected to lead 31 in such a manner that transistor 13 is effectively in series with the unregulated input voltage. Transistor 13 must be designed to carry from its emitter to collector the current requirements of the regulator and the output load.

The base 16 of the transistor 13 is electrically connected to the emitter 19 of p–n–p current amplifying transistor 17. Collector 18 of transistor 17 is connected to lead 12 and base 20 is connected to lead 21. Lead 21 is common to the base of transistor 17 and to the collector 24 of current sensitive transistor 23 and collector 28 of voltage sensitive transistor 27. Lead 21 is connected to common lead 12 through resistor 22. The emitters 25 and 29 of transistors 23 and 27 are connected to lead 31. Transistors 23 and 27 are thereby effectively paralleled and together form a voltage divider with resistor 22.

Base 26 of p–n–p current sensitive transistor 23 is connected by lead 36 to the low side 50 of series resistor 35.

Base 30 of p–n–p voltage sensitive transistor 27 is connected to the "n" side of zener diode 32. The "p" side of diode 32 is connected by lead 33 to wiper 51 of potentiometer 34. One side of potentiometer 34 is connected to lead 31 and the other side is connected to lead 12.

Zener diode 32 is of the class of silicon junction devices which will conduct in a forward direction and which will also conduct in a reverse direction when a predetermined voltage has been applied thereacross. The reverse voltage which is sufficient to cause this nondestructive breakdown and conduction is called the zener voltage. In zener diodes designed for voltage reference, this reverse voltage drop across the diode will remain substantially constant for a wide range of reverse currents once conduction has begun. It is, therefore, a constant voltage reference device.

In the operation of the device shown in Figure 1, when a source of D.-C. potential is connected across the input terminals 10 as stated above, current will immediately begin to flow through emitter 15 into transistor 13 and out of base 16. The current which flows out of base 16 enters emitter 19 of transistor 17 and flows out of base 20 into lead 21 and through resistor 22 to common lead 12. At the commencement of operation there is no voltage at the output terminals, and the current-limiting factor is resistor 22 and the internal resistance of transistors 13 and 17. The value of resistor 22 is chosen so as to protect transistors 13 and 17 from unduly high currents and to limit the collector currents of transistors 23 and 27 to their rated value during regulation.

Current flow out of base 16 decreases the impedance of collector 14, hence current will flow through transistor 13 to lead 31. As the voltage builds up in lead 31 with respect to lead 12 a voltage differential forms between the emitter 29 and the collector 28 of voltage sensitive transistor 27. However transistor 27 offers a high impedance between leads 31 and 21 until the voltage at the base 30 exceeds the voltage at potentiometer wiper 51 by the zener voltage of diode 32.

The portion of the total voltage between leads 31 and 12 which is sensed at wiper 51 is adjustable by movement of the wiper, and in this way I can vary or set the voltage output which my invention will maintain. In appropriate cases, lead 33 may be connected to a potential divider consisting of fixed resistors, or may be connected directly to lead 12.

At the point at which the potential at base 30 exceeds the potential at wiper 51 by the zener voltage of diode 32 conduction occurs backwards throughout the diode and out of base 30. This current greatly reduces the collector impedance of transistor 27, and current flows through transistor 27 from lead 31 through resistor 22 to lead 12. The potential at lead 21, which is "floating" during normal operation, is increased by the increased IR drop across resistor 22.

The increased potential of lead 21 tends to "shut off" the current flowing through transistor 17 by raising the base potential so that less control current flows out of the base. Of course, the emitter current of transistor 17 is the base current of series transistor 13. Similarly, the decrease in base current of transistor 13 increases its collector impedance, and the voltage between leads 31 and 12 is maintained at a stabilized point determined by the balance maintained at diode 32.

Current regulation or limitation may be desired, particularly where the load is a storage battery. To this end I provide transistor 23 (with its emitter and collector connected electrically parallel to transistor 27) and a relatively low-value resistor 35. Resistor 35 is designed to carry all the load current at the output 37, and to have, at maximum desired output current, a voltage thereacross which is sufficient to control current limiting transistor 23. As the output current increases, the voltage at junction 50 becomes increasingly more negative than the voltage at emitter 25, and current will begin to flow out of base 26 into junction 50. This greatly decreases the collector 24 impedance, and increased current will flow through transistor 23 from lead 31 through resistor 22 to common lead 12. The voltage of lead 21 is affected in the same manner as during voltage regulation and acts to control the impedance of series transistor 13 in the manner described above. Current and voltage regulation are independent of each other, and either may be omitted without affecting the other.

Figure 2:
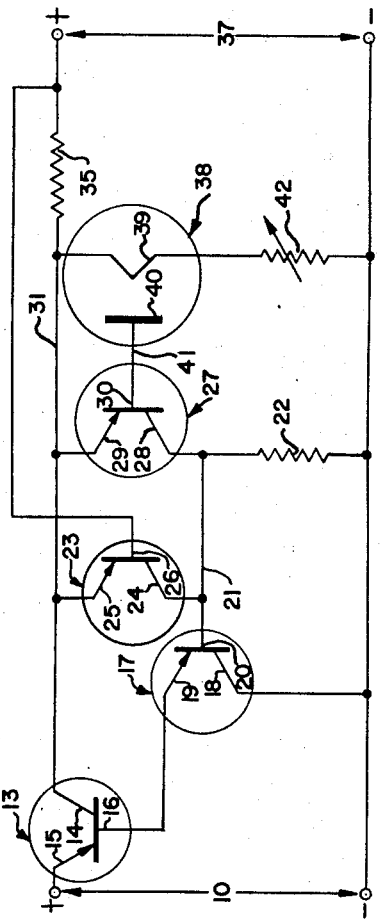
Figure 2 is a modification thereof.

In Figure 2, the voltage reference of elements consist of a temperature-saturated thermionic vacuum tube 38 and a heater temperature control rheostat 42. Base element 30 of transistor 27 is connected by lead 41 to plate 40 of tube 38. The heater-cathode 39 is connected in series with rheostat 42 between lead 31 and common lead 12.

Tube 38 is of the temperature saturating type wherein the electron flow from cathode 39 to plate 40 is dependent upon the temperature of the cathode, assuming there is sufficient voltage between the plate and the cathode. Tube 38 is operated in the current saturated region. A change in voltage between leads 31 and 12 changes the current flow through element 39 thereby changing the temperature of the cathode and the maximum saturation current which can flow through tube 38. It is readily apparent that when tube 38 is operating at saturation, increased voltage between leads 31 and 12 results in increased current flow out of base 30, thereby lowering the impedance of transistor 27 and effecting voltage regulation in the maner described above.

Rheostat 42 is adjustable for control of output voltage and protection of tube 38. I have found that tungsten filament tubes such as 1B3GT and 2AS-15 are satisfactory for tube 38. Also, gas filled diode regulators, such as neon tube NE-2, may be used in lieu of diode 32 where the voltage which can be applied across the tube is sufficient to cause the tube to conduct.

Figure 3:
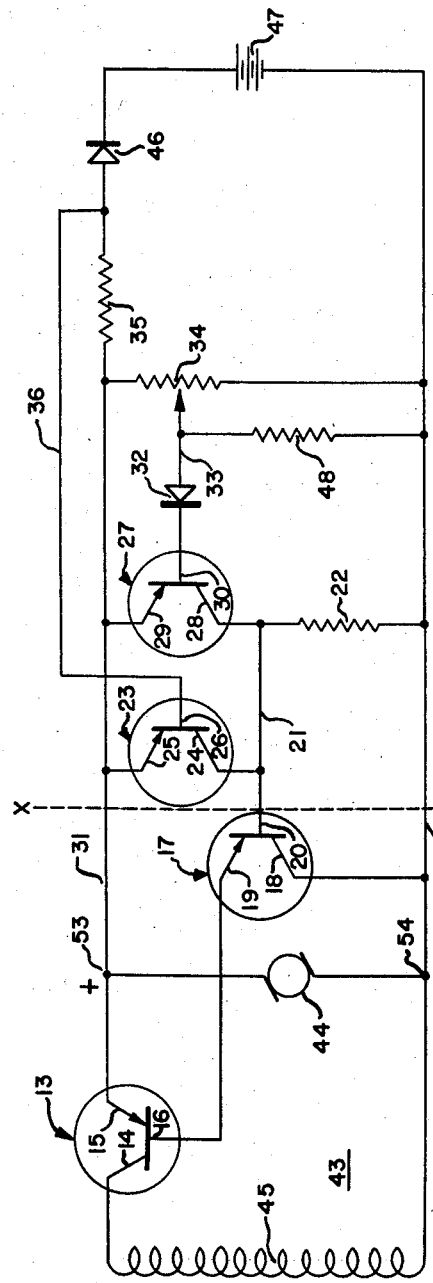
Figure 3 represents my invention modified to control the charging of a battery as in a motor vehicle.

Figure 3 is a modification of my invention to control the charge rate and voltage of a storage battery 47 by a generator 43 as in a motor vehicle. A generator field 45 is connected in series with collector 14 and common lead 12. Armature 44 is connected to lead 31 at terminal 53 and to lead 12 at terminal 54 with the positive output at lead 31. Lead 31 is terminated at emitter 15 of series transistor 13. Conventional diode 46 is placed between resistor 35 and battery 47 with polarity so as to prevent reverse current flow when generator 43 is not charging. A conventional cutout relay may be used in place of diode 46.

Resistor 48 has a negative coefficient of resistance, and may be connected, as shown, between lead 33 and common lead 12. The effect of resistor 48 in battery charge regulators is to permit a higher maximum output voltage when the regulator is cold than when the regulator is hot, to more nearly approximate the ideal charging conditions for storage batteries under varying temperature conditions. Resistor 48 also compensates for the temperature-sensitive characteristic that may be inherent in diode 32 wherein increased ambient temperature results in a decrease in the zener voltage at which diode 32 will conduct. With certain silicon diodes, increasing the operating temperature has the effect of increasing the zener voltage, and in such cases, it may be necessary to connect resistor 48 between leads 33 and 31 to compensate for this effect.

In the operation of my invention as a field control device, as shown in Figure 3, a voltage is induced in armature 44 during start-up due to the residual magnetism in field 45. This voltage appears across the armature terminals 53 and 54. Current begins to flow from armature 44 into the emitter 15 of transistor 13, and out of base 16 into transistor 17. Current will also flow through transistor 13 into field 45, and soon the armature output will reach a value, as predetermined by the adjustment of potentiometer 34, where diode 32 will conduct and thereby regulate in the manner heretofore described.

Figure 4:
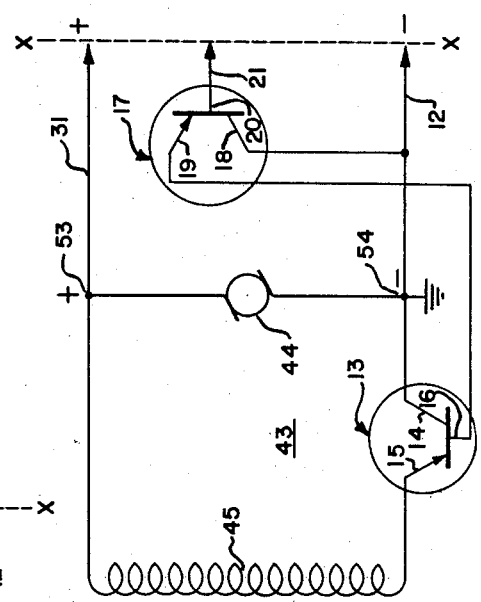
Figure 4 and Figure 5 are modifications of a portion of Figure 3.

Figure 4 represents a modification of the circuit shown to the left of line x—x on Figure 3. In Figure 4, collector 14 of transistor 13 is connected to common lead 12. Field 45 is connected to transistor 13 at emitter 15. The opposite lead of field 45 is connected to the positive side of armature 44 and to lead 31 at junction 53. Armature 44 is grounded at junction 54. As in Figure 3, base 16 is connected to emitter 19 of transistor 17. This arrangement of transistor 13 is desirable where the collector element is physically grounded to its case for heat dissipation from the junction. The case may be directly grounded to a heat sink.

The operation of transistor 13 in Figure 4 is essentially the same as that described for Figure 3. The only difference electrically is that emitter 15 is now in the field circuit, and collector 14 is connected to the negative output of the armature. The impedance which transistor 13 presents to field current flow is, as before, dependent upon the amount of current flow through base 16, as controlled by transistor 17, heretofore, described.

It will be noted that I have provided in Figures 3 and 4 a voltage regulator suitable for controlling the battery charging systems of motor vehicles which is capable of efficient regulation at the low voltages therein encountered, and which eliminates the troublesome moving and vibratory elements presently used in such regulators. It will also be noted that my invention permits the use of a generator whose field has been designed to operate at lower voltages than the armature. An advantage of such a generator on motor vehicles is that it permits a greater output voltage at reduced r.p.m. Where, in existing systems, the armature output may not be sufficient to cause the cutout relay to close at idle r.p.m. (since the voltage across the field is less than rated voltage) my invention provides full field voltage to a field designed for operation at reduced voltage.

Figure 5:
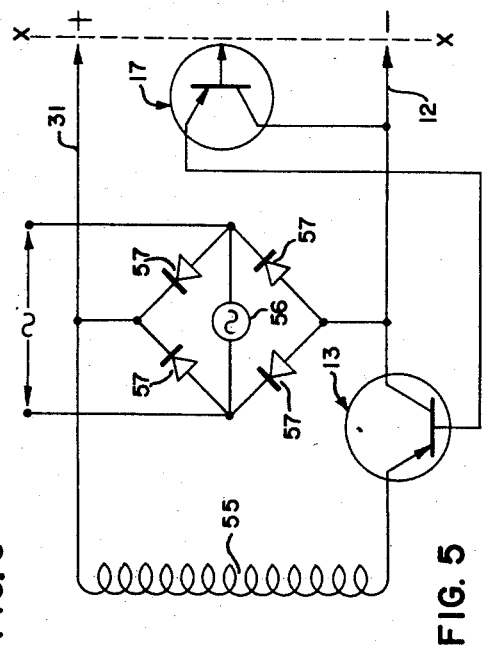

Figure 5 is another modification of the circuit on the left of line x—x in Figure 3. In Figure 5, an alternator field 55 is controlled by my invention, the output of the rotor 56 passing through rectifiers 57 to leads 31 and 12, and the value thereof controlled as heretofore described by control of the exciter current through field 55.

Figure 6:
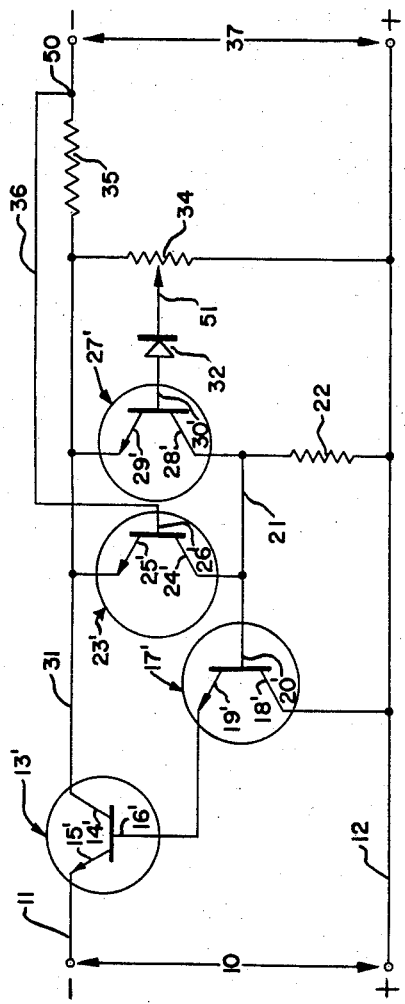
Figure 6 is another form of my invention.

The circuit in Figure 6 differs from Figure 1 in that it has been modified for reversed polarity of the input voltage. This modification may be desired for control of a positive-grounded D.-C. voltage. Figure 6 differs from Figure 1 in that: (1) the positive input is connected to lead 12, and the negative, to lead 11; (2) all transistors are n-p-n; (3) the polarity of zener diode 32 is reversed; and (4) the positive output voltage is taken at lead 12 and the negtaive, at junction 50.

In the operation of the circuit shown in Figure 6, current will flow from lead 12 through resistor 22 into base 20' of transistor 17'. This current decreases the impedance of collector 18' which permits current to flow through transistor 17' into the base 16' of series transistor 13'. The collector impedance of transistor 13' decreases proportionately thereby permitting current to flow through a load in the output terminals. Transistors 23' and 27' correspond to transistors 23 and 27 in Figure 1, and together form a voltage divider with resistor 22. Voltage regulation occurs when zener diode 32 conducts from wiper arm 51 into base 30', thereby lowering the impedance of collector 28' and lowering the voltage at lead 21 controlling transistor 17'. Current regulation occurs when junction 50 becomes sufficiently more positive than lead 31 to cause current flow into base 26', lowering the impedance of collector 24' and effecting regulation as described above.

In the present state of transistor design, I have found it desirable to interpose the current amplifying transistor 17 between series transistor 13 and lead 21, particularly where the base current required to control transistor 13 is moderate to high compared to the currents which the regulating transistors 23 and 27 are designed to carry. However, it is apparent that, in appropriate cases, transistor 17 may be omitted, and the base 16 of transistor 13 may be directly connected to lead 21.

It is also apparent that n-p-n type transistors can be substituted for either or both of transistors 23 and 27 in Figure 1 merely by connecting the collector thereof to lead 31, the emitter to lead 21, and reversing the signals at the base so that current flows into, rather than out of, the base. In the case of transistor 27, diode 32 would be reversed for this purpose. In the case of transistor 23, resistor 35 would be repositioned in lead 31 between collector 14 and transistor 23, and the base of n-p-n transistor 23 would be connected to the input side of resistor 35.

By way of illustration, I have found that the following components may be used in my invention for the regulation of a 12 volt automotive electrical system:

Transistor 13: 25 watt transistor such as Minneapolis-Honeywell model P-11;
Transistor 17: Two watt transistor such as Transistor Products model X124;
Transistors 23 and 27: 125 milliwatt transistors such as RCA model 2N104;
Diode 32: 125 milliwatt silicon diode with six volt zener voltage such as National Semiconductor Products model 1N429;
Diode 46: 40 ampere diode such as Westinghouse N-5051-D;
Potentiometer 34: 100 ohms, two watt;
Resistor 22: 600 ohms, one watt;
Resistor 35: Iron wire-wound, 125 millivolts at 40 amperes;
Resistor 48: Thermistor, nominal 400 ohms at room temperature;
Field 45: Two ohms, resistance, six volt rating;
Armature 44: 12 volts nominal output.

It will be understood that the invention is not to be limited to the exact construction shown and described, but that various changes and modifications may be made without departing from the spirit and scope of the invention, as defined in the appended claims.

What is claimed is:

1. In a battery charge regulator for motor vehicle electrical systems, a generator having a control field and an armature, a field control transistor having a collector element, an emitter element, and a base element, a circuit portion comprising said first two-named elements connected in series with said field, said circuit portion connected in parallel relationship with said armature whereby the control current to said field passes through said transistor, an armature output lead, a common lead including connections to said portion and said armature, a series-parallel voltage divider connected between said output lead and said common lead including a series resistance portion connected at a junction to a parallel portion, said parallel portion including a pair of transistors having collector, emitter, and base elements, the collector and emitter elements thereof parallel connected to form the parallel portion of said voltage divider, control means associated with said junction and the base element of said field control transistor to control the impedance of said transistor in accordance with the voltage at said junction, a current responsive means in said output lead, the base element of one of said transistors in said parallel portion connected at said means so as to decrease the impedance of said transistor upon increased current through said means, the base element of the remaining transistor in said parallel portion connected to a constant voltage reference means so as to decrease the impedance of said transistor upon increased voltage at said output lead.

2. A regulator as in claim 1 wherein the constant voltage reference means includes a silicon diode.

3. A regulator as in claim 1 wherein the control means consists of a current amplifying transistor having a base element connected to said junction and one of a group comprising an emitter and a collector connected to the base element of said field control transistor in such a manner that the normal current flow in each connected element is complimentary, the remainder of said group connected to said common lead.

4. A regulator as in claim 1 wherein the current responsive means consists of a relatively low-value resistance.

References Cited in the file of this patent

UNITED STATES PATENTS

| | | |
|---|---|---|
| 2,693,568 | Chase | Nov. 2, 1954 |
| 2,698,416 | Sherr | Dec. 28, 1954 |
| 2,776,382 | Jensen | Jan. 1, 1957 |